(12) United States Patent
Ohmuro

(10) Patent No.: US 8,786,837 B2
(45) Date of Patent: Jul. 22, 2014

(54) DISTANCE MEASURING APPARATUS

(75) Inventor: Hitoshi Ohmuro, Tokyo (JP)

(73) Assignee: Nikon Vision Co., Ltd., Tokyo (JP)

( * ) Notice: Subject to any disclaimer, the term of this patent is extended or adjusted under 35 U.S.C. 154(b) by 124 days.

(21) Appl. No.: 13/542,224

(22) Filed: Jul. 5, 2012

(65) Prior Publication Data

US 2013/0010278 A1    Jan. 10, 2013

(30) Foreign Application Priority Data

Jul. 8, 2011   (JP) .................................. 2011-151402

(51) Int. Cl.
*G01C 3/08* (2006.01)

(52) U.S. Cl.
USPC ......... 356/4.01; 356/3.01; 356/4.1; 356/5.01; 356/5.1

(58) Field of Classification Search
USPC ............. 356/3.01–28.5, 3.01–3.15, 4.01–4.1, 356/5.01–5.15, 6–22, 28
See application file for complete search history.

(56) References Cited

U.S. PATENT DOCUMENTS

| 5,805,527 | A | 9/1998 | Hoashi et al. |
| 6,587,185 | B1 * | 7/2003 | Ide et al. ...................... 356/5.01 |
| 7,898,647 | B2 | 3/2011 | Sakai |

FOREIGN PATENT DOCUMENTS

| JP | A-08-179032 | 7/1996 |
| JP | A-2008-275379 | 11/2008 |

* cited by examiner

*Primary Examiner* — Luke Ratcliffe
(74) *Attorney, Agent, or Firm* — Oliff PLC

(57) ABSTRACT

The present application provides a distance measuring apparatus that can measure a distance with accuracy even when a light receiving level of a reflected light becomes saturated. A light emitting section of the distance measuring apparatus emits a measuring light toward an object to be measured. A light receiving section receives the reflected light being reflected from the object to be measured. A distance calculating section obtains a distance to the object to be measured based on an elapsed time which is from a point the measuring light is emitted until a point a light receiving level of the reflected light indicates a peak thereof. A distance correcting section corrects a value of the distance to the object to be measured depending on a length of saturation time of the light receiving level when the light receiving level becomes saturated and the peak is impossible to identify.

2 Claims, 7 Drawing Sheets

DISTANCE MEASURING APPARATUS

CROSS-REFERENCE TO THE RELATED APPLICATION

This application is based upon and claims the benefit of priority from Japanese Patent Application No. 2011-151402, filed on Jul. 8, 2011, the entire contents of which are incorporated herein by reference.

BACKGROUND

1. Field

The present application relates to a distance measuring apparatus.

2. Description of the Related Art

There has conventionally been known a distance measuring apparatus that emits a pulse laser beam toward an object to be measured, measures elapsed time required to receive the reflected light reflected from the object to be measured, and measures a distance up to the object to be measured based on the elapsed time and a propagation speed of the laser beam.

In addition, a distance measuring apparatus has been proposed, which can reduce a measurement error by selecting a received light signal indicating the most probable original time, in measuring a time difference between a signal transmitted toward an object to be measured and a received light signal reflected and returned on the object to be measured, as disclosed in Japanese Unexamined Patent Application Publication No. 2008-275379.

However, the conventional distance measuring apparatus exhibits a poor distance measuring accuracy when, for example, a light receiving level of reflected light becomes saturated.

SUMMARY

In view of the foregoing problem, it is a proposition to provide a distance measuring apparatus that can measure the distance with accuracy even when a light receiving level of reflected light becomes saturated.

A distance measuring apparatus according to one aspect of the present embodiment includes a light emitting section, a light receiving section, a distance calculating section, and a distance correcting section. The light emitting section emits a measuring light toward an object to be measured. The light receiving section receives a reflected light being reflected from the object to be measured. The distance calculating section obtains a distance to the object to be measured based on an elapsed time which is from a point the measuring light is emitted until a point a light receiving level of the reflected light indicates a peak thereof. The distance correcting section corrects a value of the distance to the object to be measured depending on a length of saturation time of the light receiving level when the light receiving level becomes saturated and the peak is impossible to identify.

In a distance measuring apparatus according to the one aspect of the present embodiment, a light emitting section may emit measuring light a plurality of times.

In a distance measuring apparatus according to the one aspect of the present embodiment, a distance calculating section may further include a counting section that counts each where the light receiving section measured a light received amount exceeding a threshold value when the measuring light is emitted the plurality of times and that obtains the light receiving level at each point by accumulating a frequency being counted. Moreover, the distance calculating section may obtain the distance to the object to be measured based on an elapsed time at a point where an accumulated number of the frequency indicates a peak thereof. In addition, the distance correcting section may correct, when the accumulated number of the frequency becomes a saturated state, the value of the distance to the object to be measured depending on a length of time in the saturated state.

In the distance measuring apparatus according to the one aspect of the present embodiment, a distance correcting section may increase a correction amount for correcting the value of the distance as the length of saturation time of the light receiving level becomes longer.

Therefore, the present application may provide the distance measuring apparatus that can measure a distance with accuracy even when the light receiving level of the reflected light becomes saturated.

DETAILED DESCRIPTION OF THE EMBODIMENTS

Description of First Embodiment

Figure 1:
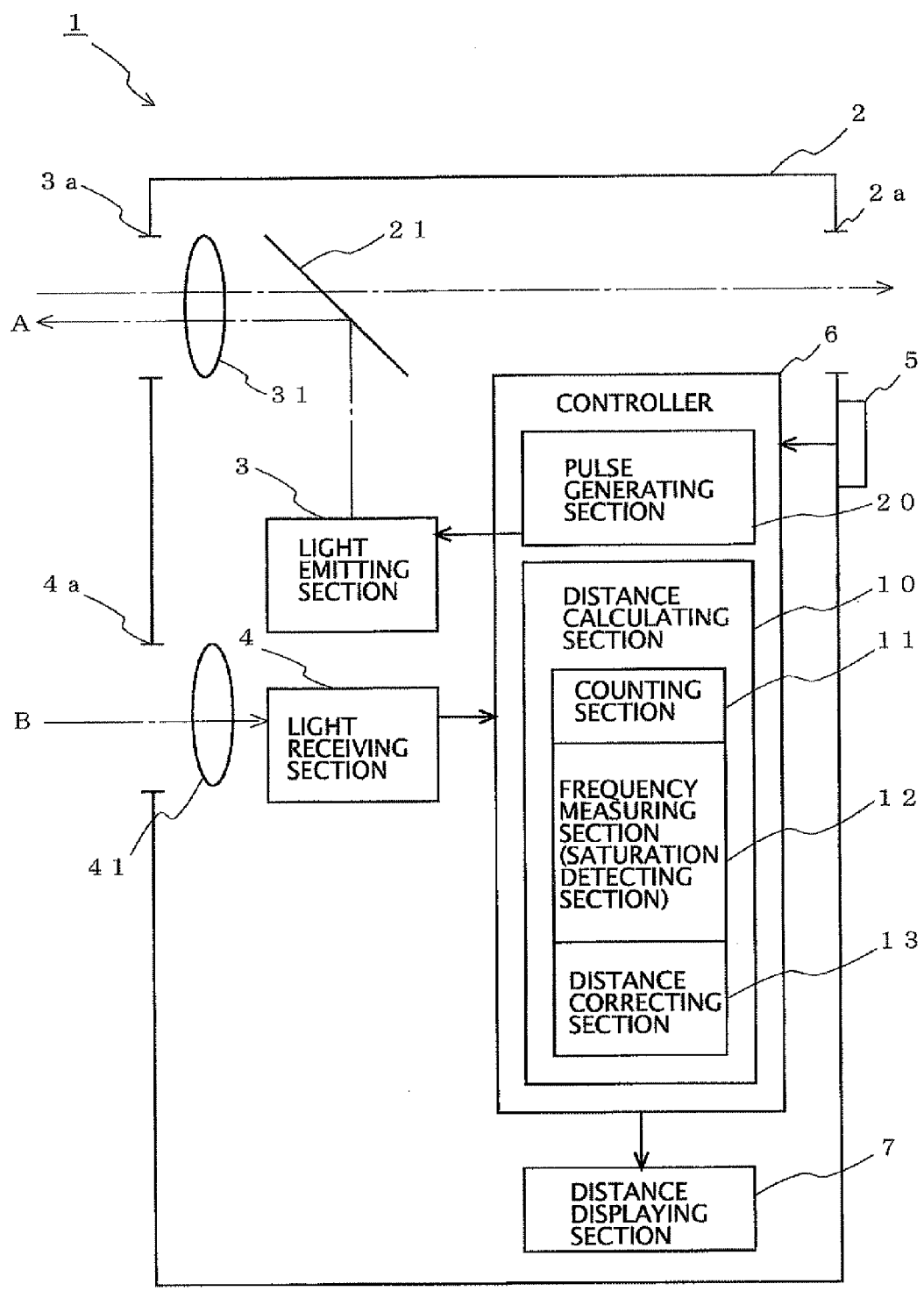
FIG. 1 is a block diagram showing a configuration example of a distance measuring apparatus according to a first embodiment.

FIG. 1 is a block diagram showing a configuration example of a distance measuring apparatus according to a first embodiment. The distance measuring apparatus according to the first embodiment is used for distance measurement, for example, in sports, hunting and the like.

The distance measuring apparatus 1 according to the first embodiment includes a housing 2, a light emitting section 3, a light receiving section 4, an operation button 5, a controller 6, and a distance displaying section 7. Each of the light emitting section 3, the light receiving section 4, the operation button 5, and a distance displaying section 7 is connected to the controller 6.

The light emitting section 3, the light receiving section 4, the controller 6, and the distance displaying section 7 are positioned in the housing 2. Furthermore, the operation button 5 is mounted on the housing 2 so as to be exposed to the outside of the housing 2. Moreover, the housing 2 is formed with a finder window 2a, an outgoing window 3a, and a light receiving window 4a.

The finder window 2a and the outgoing window 3a form an optical finder of the distance measuring apparatus 1. On an optical path between the outgoing window 3a and the finder window 2a, there are disposed a collimator lens 31 and a half mirror 21 in order from the left of FIG. 1.

A part of beams incident from the outgoing window 3a are guided to the finder window 2a, penetrating through the collimator lens 31 and the half mirror 21. Thus, an operator can visually observe the object to be measured through the finder window 2a and the outgoing window 3a.

The light emitting section 3 outputs measuring light (pulse-like laser beam) with which the object to be measured is irradiated. The light emitting section 3 is made of, for example, a light emitting element (laser diode) and a drive circuit of the light emitting element.

Here, the measuring light emitted from the light emitting section 3 is reflected on the half mirror 21 and guided to the collimator lens 31 and the outgoing window 3a. Accordingly, when measuring light is emitted from the light emitting section 3 in a state where an operator peers through an optical finder, the measuring light is emitted toward the object to be measured (a direction of an arrow A in FIG. 1) which the operator visually observes.

The light receiving section 4 receives the light incident from the light receiving window 4a (for example, measuring light reflected on the object to be measured). The light receiving section 4 is made of, for example, a light receiving element (photo diode) and a receiving circuit. It should be noted that between the light receiving window 4a and the light receiving section 4, a condensing lens 41 is disposed. The light incident from the light receiving window 4a (light from the direction of arrow B in FIG. 1) is condensed by the condensing lens 41 and is subject to photoelectric conversion by the light receiving element. Then, an output (a received light signal) of the light receiving element is transmitted to the controller 6 after being amplified by the receiving circuit.

The operation button 5 has a function of a switch for starting distance measurement. In addition, the operation button 5 also has functions of a unit mode change switch (selection of unit such as meter or yard, of the distance displaying section 7) and a switch for turning on/off a backlight of the distance displaying section 7.

The controller 6 is a circuit for controlling the operation of the distance measuring apparatus 1 and, for example, FPGA or the like are used. The controller 6 has a distance calculating section 10 for calculating the distance up to the object to be measured and a pulse generating section 20.

The distance calculating section 10 obtains the distance up to the object to be measured, based on an elapsed time required for a light receiving level of reflected light to show a peak value after measuring light is emitted. In addition, the distance calculating section 10 has a counting section 11, a frequency measuring section (a saturation detecting section) 12, and a distance correcting section 13. Meanwhile, the counting section 11, the frequency measuring section (the saturation detecting section) 12, and the distance correcting section 13 will be described later.

The pulse generating section 20 generates a pulse signal for defining the operation timing of the distance measuring apparatus. A pulse-like laser beam (measuring light) is emitted from the light emitting element of the light emitting section 3 in accordance with a pulse signal from the pulse generating section 20. By using the pulse signal, elapsed time required for the light receiving section 4 to output a received light signal after measuring light is emitted can be obtained.

The distance displaying section 7 displays a distance inside the finder window 2a by receiving a display instruction from the controller 6. The distance displaying section 7 may display information by illumination, for example, on an outer edge of an image of an optical finder, or overlay and display information on an image of an optical finder. Meanwhile, the distance displaying section 7 may be, for example, a liquid crystal display device or the like positioned on the outside of the housing 2.

Operational Description of First Embodiment

Figure 2:
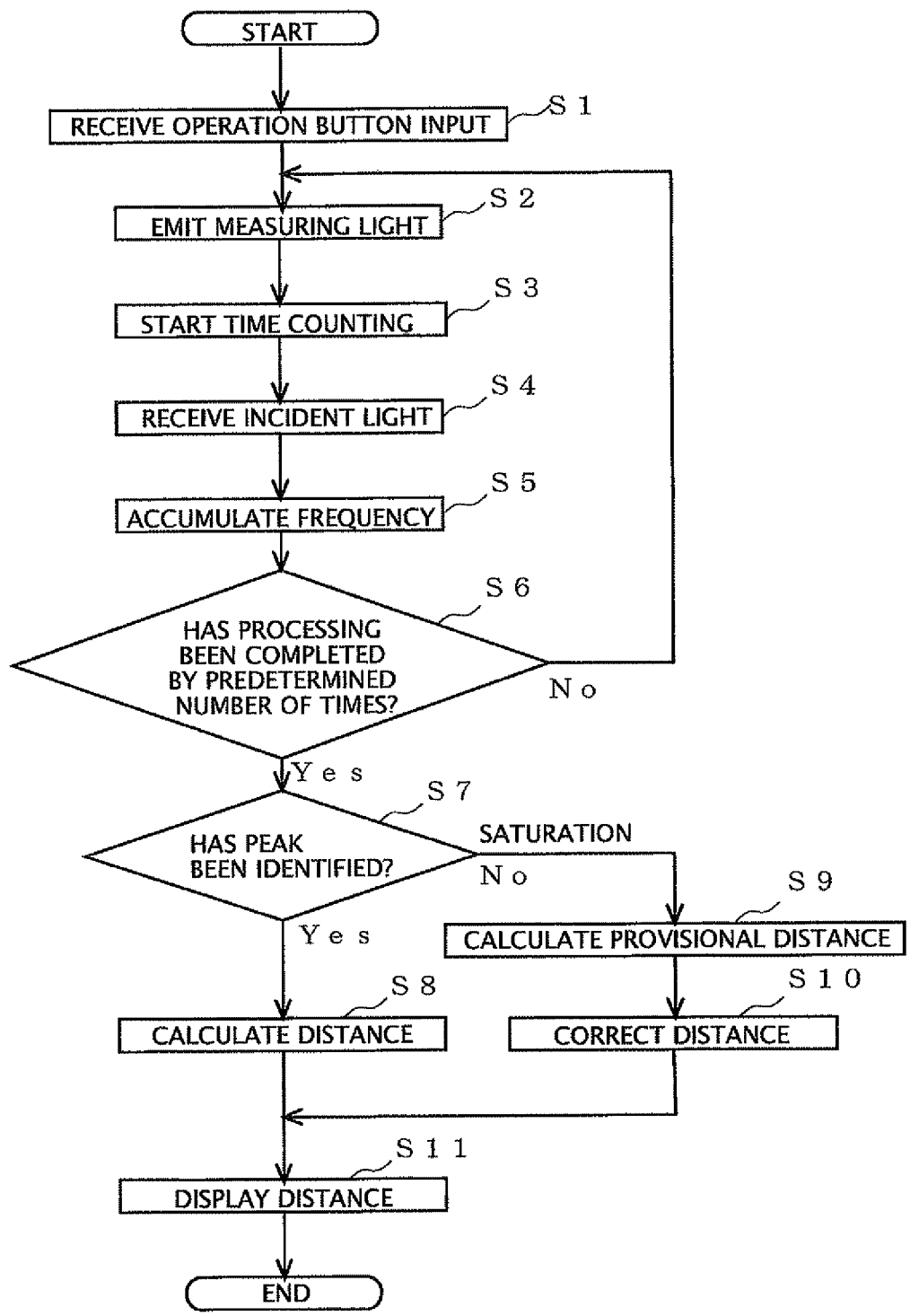
FIG. 2 is a flowchart showing an operation of a distance measuring apparatus according to a first embodiment.

Hereinafter, the operation of the distance measuring apparatus 1 according to the first embodiment will be described below. FIG. 2 is a flowchart showing an operational example of the distance measuring apparatus 1 according to the first embodiment.

Step S1: When an operator operates the operation button 5 in such a state as to observe an object to be measured through the finder window 2a, the controller 6 receives an input (an instruction of distance measurement start) from the operation button 5.

The distance measuring apparatus according to the first embodiment emits measuring light a plurality of times, for example, 550 times for each distance measurement (an operation of the operation button 5 for one time in S1). The processing (measurement operations) of S2-S5, which will be described later, is repeated by the number of times of emission of measuring light. Meanwhile, the number of times of measurement operations is controlled by the controller 6.

Step S2: The controller 6 operates the light emitting section 3 to emit pulse-like laser beam from the light emitting element toward the object to be measured. Meanwhile, a part of the measuring light emitted from the light emitting section 3 is guided to the light receiving section 4 by reflection on the object to be measured, via light receiving window 4a and the condensing lens 41.

Step S3: The controller 6 starts time counting by setting the point in time when the measuring light is emitted, as a starting point.

Step S4: The light receiving section 4 receives the light incident from the light receiving window 4a.

Step S5: The counting section 11 of the distance calculating section 10 counts frequency at the point in time when the light receiving section 4 measures the amount of light received exceeding the threshold value (for example, when a value of a received light signal exceeds a predetermined intensity threshold value). The frequency to be counted for each point in time is stored in a memory (not shown) in the controller 6.

As an example, when a received light signal exceeding the intensity threshold value is measured X milliseconds after measuring light is emitted, the counting section 11 counts, by one, the frequency corresponding to X milliseconds. The intensity threshold value is set, for example, so as to be significantly larger than the signal intensity of fixed light and to be smaller than the signal intensity of measuring light. Therefore, the frequency is counted only when the light significantly stronger than the fixed light is made incident, as is the case for the reflected light of measuring light.

Furthermore, the frequency counts described above are accumulated at measurement operations (S2-S5) repeated by a plurality of times. For example, when a frequency is counted again at the same point in time as when the frequency is counted in the last measurement operation for the second measurement operation, the frequency corresponding to the point in time is accumulated to become 2. The upper limit of the accumulated number of the frequency is the same number of times as the number of emissions of the measuring light (for example, 550 times). Meanwhile, in the first embodiment, the accumulated number of the frequency obtained from a plurality of measurement operations at each point in time is handled as a light receiving level at each point in time.

Figure 3:
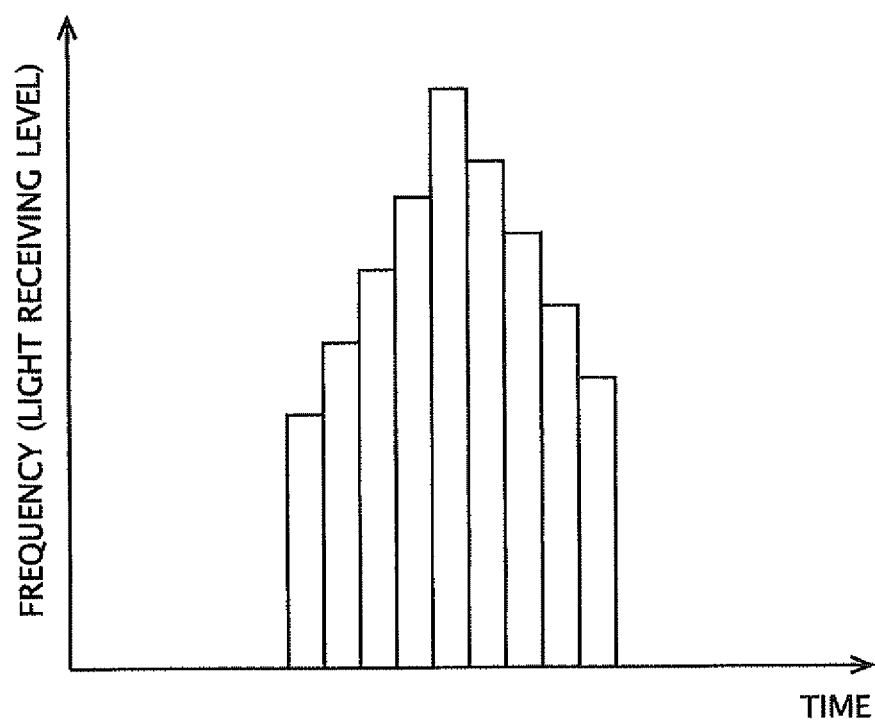
FIG. 3 is a view showing an example of a frequency distribution between an elapsed time after measuring light emits and a frequency accumulated in measurement operations.

FIG. 3 is a view showing an example of a frequency distribution between an elapsed time after measuring light emits and a frequency accumulated at measurement operations. In the frequency distribution shown in FIG. 3, the vertical axis shows an accumulated number of the frequency (a light receiving level) at each point in time and horizontal axis shows an elapsed time after measuring light is emitted. As one example, a step (increment/decrement) of the elapsed time in the frequency distribution is 12.5 nanoseconds.

Meanwhile, in one measurement operation, when the reflected light on the Object to be measured and strong external light are made incident at different points in time, the counting section 11 counts the frequency when each light is made incident. That is, the frequency may be counted at a plurality of points in time in one measurement operation. However, although reflected light on the object to be measured is measured at approximately the same point in time in a plurality of measurement operations, external light is not measured at the same point in time in the plurality of measurement operations. Therefore, both thereof can be identified from the whole viewpoint of the plurality of measurement operations.

Step S6: The controller 6 determines whether or not processing of S2-S5 are completed by a predetermined number of times (in the above case, 550-time measurement operations). When the above requirements are satisfied (Yes side), the controller 6 moves processing to step S7. In contrast, when the above requirements are not satisfied (No side), the controller 6 counts the number of times of measurement operations by once, moves the processing to step S2 and repeats the above operations.

Step S7: The controller 6 determines whether or not a point in time of a peak of a light receiving level corresponding to reflected light on the object to be measured can be identified. When the above requirements are satisfied (Yes side), the controller 6 moves the processing to step S8. When the above requirements are not satisfied (No side), the controller 6 moves the processing to step S9.

As an example, the frequency measuring section (a saturation detecting section) 12 of the distance calculating section 10 makes reference to a light receiving level (an accumulated number of the frequency) at each point in time. Then, the frequency measuring section (the saturation detecting section) 12 may identify a point in time (a maximum bin) when the light receiving level becomes maximum, of such points in time that the light receiving level indicates a peak, as a peak of the light receiving level corresponding to reflected light on the object to be measured. In contrast, when the light receiving level reaches the upper limit to become a saturated state (refer to FIGS. 4A and 4B), the controller 6 determines that the above peak point in time cannot be identified.

Step S8: The distance calculating section 10 calculates the distance up to the object to be measured by using elapsed time at such a point in time that a light receiving level indicates a peak (a point in time of the identified maximum bin in S7). It should be noted that the elapsed time can be converted into a distance up to the object to be measured by using a known spatial propagation speed of a laser beam. Subsequently, the processing is moved to S11.

Step S9: The distance measuring apparatus 10 calculates a provisional distance up to the object to be measured. As an example, the distance measuring section 10 in S9 may calculate the provisional distance up to the object to be measured, based on such a point in time that a variation in a light receiving level increases most greatly in the time-axis direction (generally, a point where a waveform of the light receiving level rises in the frequency distribution), in the vicinity of a period during which the light receiving level is in the saturated state.

Step S10: The distance correcting section 13 corrects a value of a provisional distance (S9) depending on the time during which a light receiving level is in the saturated state and estimates a distance up to the object to be measured.

As an example, the distance correcting section 13 adds a correction amount to be determined depending on the time of the saturated state to a provisional distance and estimates a distance up to the object to be measured. The correction amount increases in proportion to a length of the time of the saturated state.

Generally, a crest of a waveform of the light receiving level on a frequency distribution becomes larger in proportion to the magnitude of the light receiving level at the peak. When the light receiving level is in the saturated state, the peak of the waveform of the light receiving level cannot be identified directly from the waveform of the frequency distribution. However, if the time of the saturated state is known, the magnitude of the crest of the waveform of the light receiving level can be estimated, and thus estimation of a peak point in time of the light receiving level buried in the saturated state is also possible.

Figure 4A:
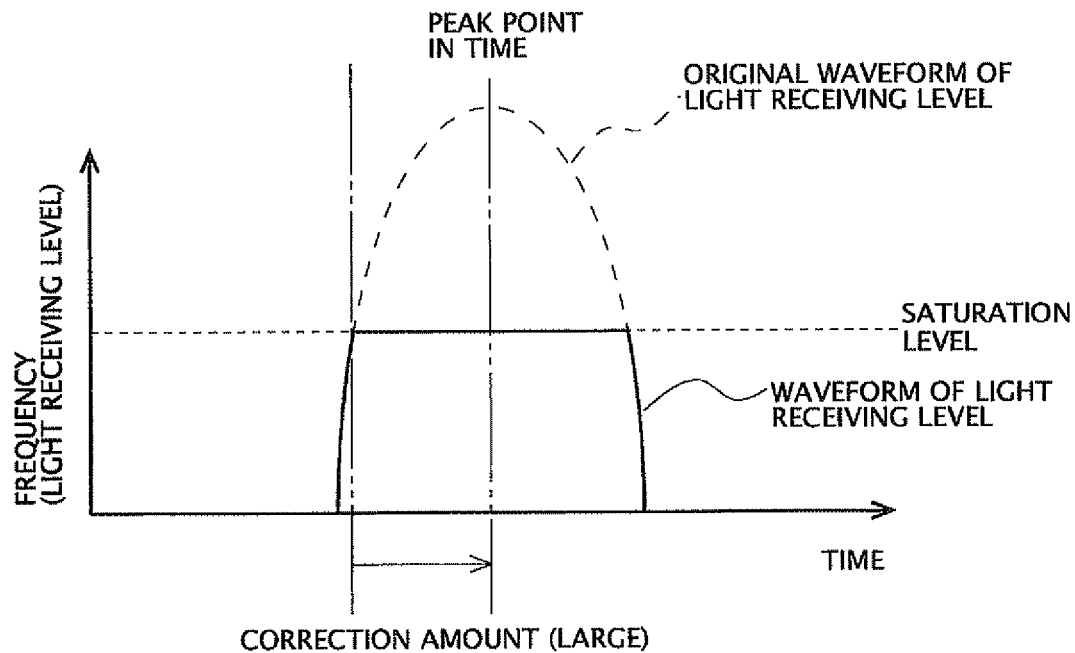
FIG. 4A is an explanatory drawing showing a correction example for a provisional distance with a distance measuring apparatus.
Figure 4B:
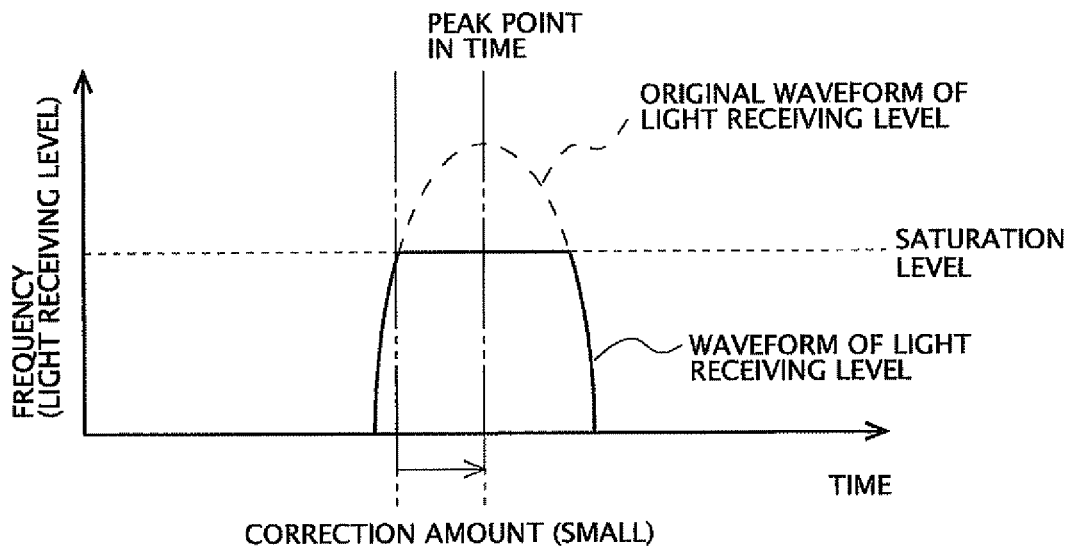
FIG. 4B is an explanatory drawing showing a correction example for a provisional distance with a distance measuring apparatus.

FIGS. 4A and 4B are explanatory drawings showing a correction example for a provisional distance with a distance measuring apparatus. The vertical axis of FIGS. 4A and 4B show a light receiving level (frequency) and the horizontal axis of FIGS. 4A and 4B show an elapsed time after measuring light is emitted. In addition, in FIGS. 4A and 4B, a waveform of a light receiving level are shown by a solid line and an original waveform of the light receiving level buried in a saturated state is shown by a broken line.

FIG. 4A schematically shows a case where a light receiving level is in a saturated state for a long time. In this case, a crest of an original waveform of the light receiving level is large, and a divergence between the provisional distance obtained in S9 and a peak (a true value of a distance) of the original waveform becomes larger. Accordingly, in this case, the distance correcting section 13 increases the correction amount for the provisional distance.

FIG. 4B schematically shows a case where a light receiving level is in a saturated state for a short time. In this case, the crest of the original waveform of the light receiving level is small as compared with that in FIG. 4A, and a divergence between the provisional distance obtained in S9 and the peak (a true value of a distance) of the original waveform becomes relatively smaller. Accordingly, in this case, the distance correcting section 13 decreases the correction amount for the provisional distance as compared with that in FIG. 4A.

The correspondence relationship between the time during which the light receiving level is in a saturated state and the correction amount may be determined based on, for example, results obtained from previous experiments or the like.

Step S11: The controller 6 causes the distance displaying section 7 to display a distance (S8) calculated by the distance calculating section 10 or a distance (S10) estimated by the distance correcting section 13. Therefore, the operator can check the distance up to the object to be measured by the display through the finder window 2a. This is the end of the description of the flowchart.

Advantages of First Embodiment

First, as a comparative example, a measurement example will be briefly described with a conventional distance measuring apparatus. In the conventional distance measuring apparatus, when a distance up to an object to be measured is long, the light receiving level of reflected light becomes smaller, and thus a measured value tends to be calculated a little longer. On the contrary, when the distance up to the object to be measured is short, the light receiving level of reflected light becomes larger, and thus a measured value tends to be calculated a little shorter. Accordingly, the conventional distance measuring apparatus, when a distance the measured value indicates is long, regularly performs correction so that the measured value becomes short and, when a distance the measured value indicates is short, regularly performs correction so that the measured value becomes long.

In the conventional distance measuring apparatus, however, for example, when a difference is generated in the light receiving level of reflected light even at the same distance due to high/low reflectance or large/small area of the object to be measured, significant variations in the measured values may occur. Accordingly, by only the above correction using the conventional distance measuring apparatus, it was not always possible to obtain a distance with accuracy.

In contrast, in the distance measuring apparatus 1 according to the first embodiment, the distance calculating section 10 obtains the distance up to the object to be measured, based on an elapsed time required for a light receiving level of reflected light to show a peak value after measuring light is emitted (S8). The distance correcting section 13 corrects the distance up to the object to be measured depending on a length of the time at which the light receiving level become saturated, when the light receiving level becomes saturated and a peak point in time is impossible to be identified (S9 and S10). Therefore, the distance measuring apparatus 1 according to the first embodiment can measure the distance up to the object to be measured with accuracy both of when the light receiving level is small in an unsaturated state and when the light receiving level is in a saturated state.

In addition, the distance measuring apparatus 1 according to the first embodiment emits measuring light a plurality of times and performs a plurality of measurement operations, and thus S/N ratio can be improved at the time of measurement.

Description of Second Embodiment

Figure 5:
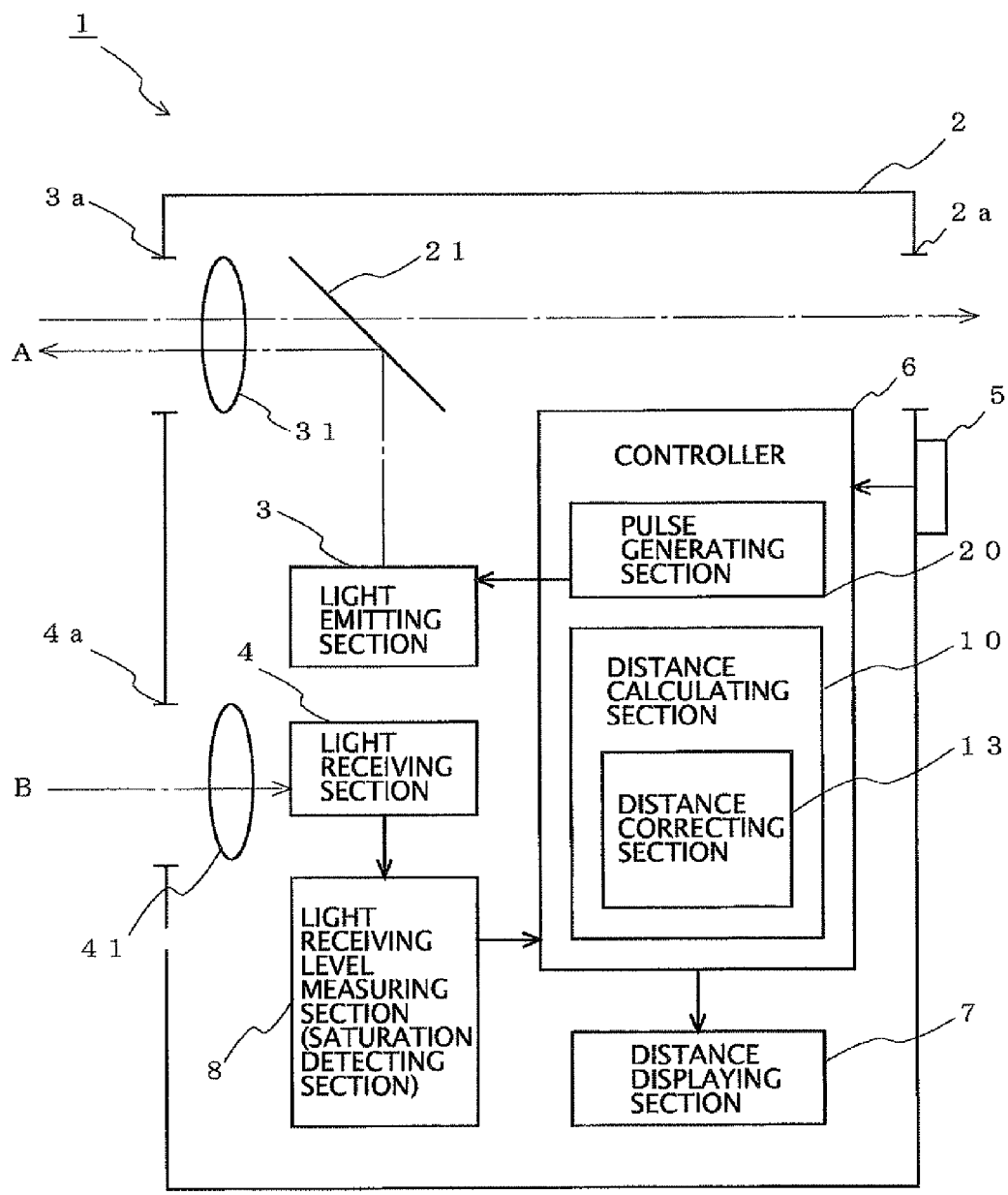
FIG. 5 is a block diagram showing a configuration example of a distance measuring apparatus according to a second embodiment.

Next, a distance measuring apparatus according to a second embodiment will be described below. FIG. 5 is a block diagram showing a distance measuring apparatus according to a second embodiment. The distance measuring apparatus 1 according to a second embodiment has a basic configuration common to that of the first embodiment. Accordingly, the description of the second embodiment uses the same characters for the same configuration as that of the first embodiment and duplicated description will be omitted.

For the distance measuring apparatus 1 according to the second embodiment, a light receiving level measuring section (a saturation detecting section) 8 is connected to an output side of a light receiving section 4, in addition to the configuration of the distance measuring apparatus 1 according to the first embodiment. An output of the light receiving level measuring section (a saturation detecting section) 8 is connected to a controller 6. It should be noted that a distance calculating section 10 according to the second embodiment has only a distance correcting section 13.

Figure 6:
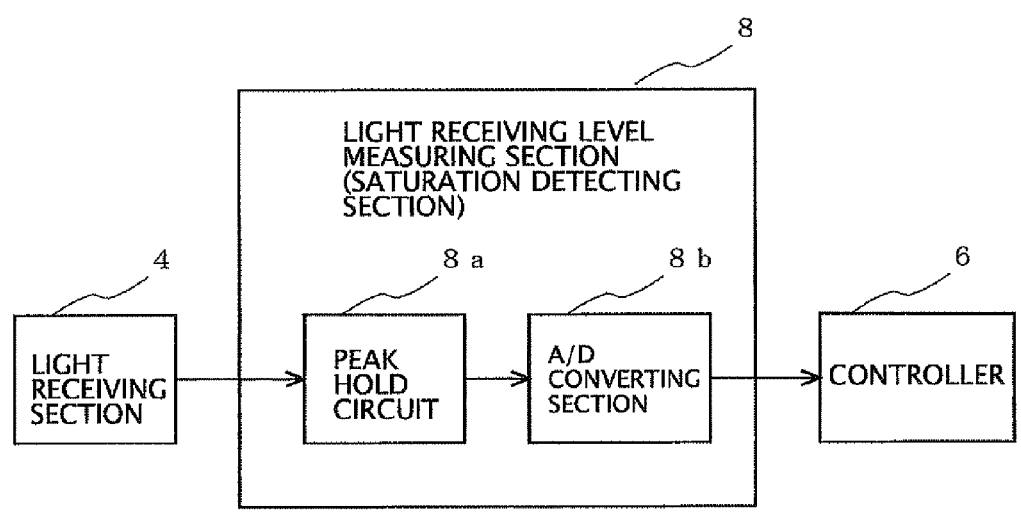
FIG. 6 is a view showing a configuration example of a light receiving level measuring section (a saturation detecting section) in a distance measuring apparatus according to a second embodiment.

FIG. 6 is a block diagram showing a configuration of the light receiving level measuring section (a saturation detecting section) 8. The light receiving level measuring section (a saturation detecting section) 8 has a peak hold circuit 8a and an A/D converting section 8b. The light receiving level measuring section (a saturation detecting section) 8 uses the peak hold circuit 8a, which maintains a peak of a signal received by the light receiving section 4. The A/D converting section 8b converts a peak level into a digital value, which is then output to the controller 6. That is, in the second embodiment, the amount of light received is handled to be a light receiving level as it is.

Operational Description of Second Embodiment

Figure 7:
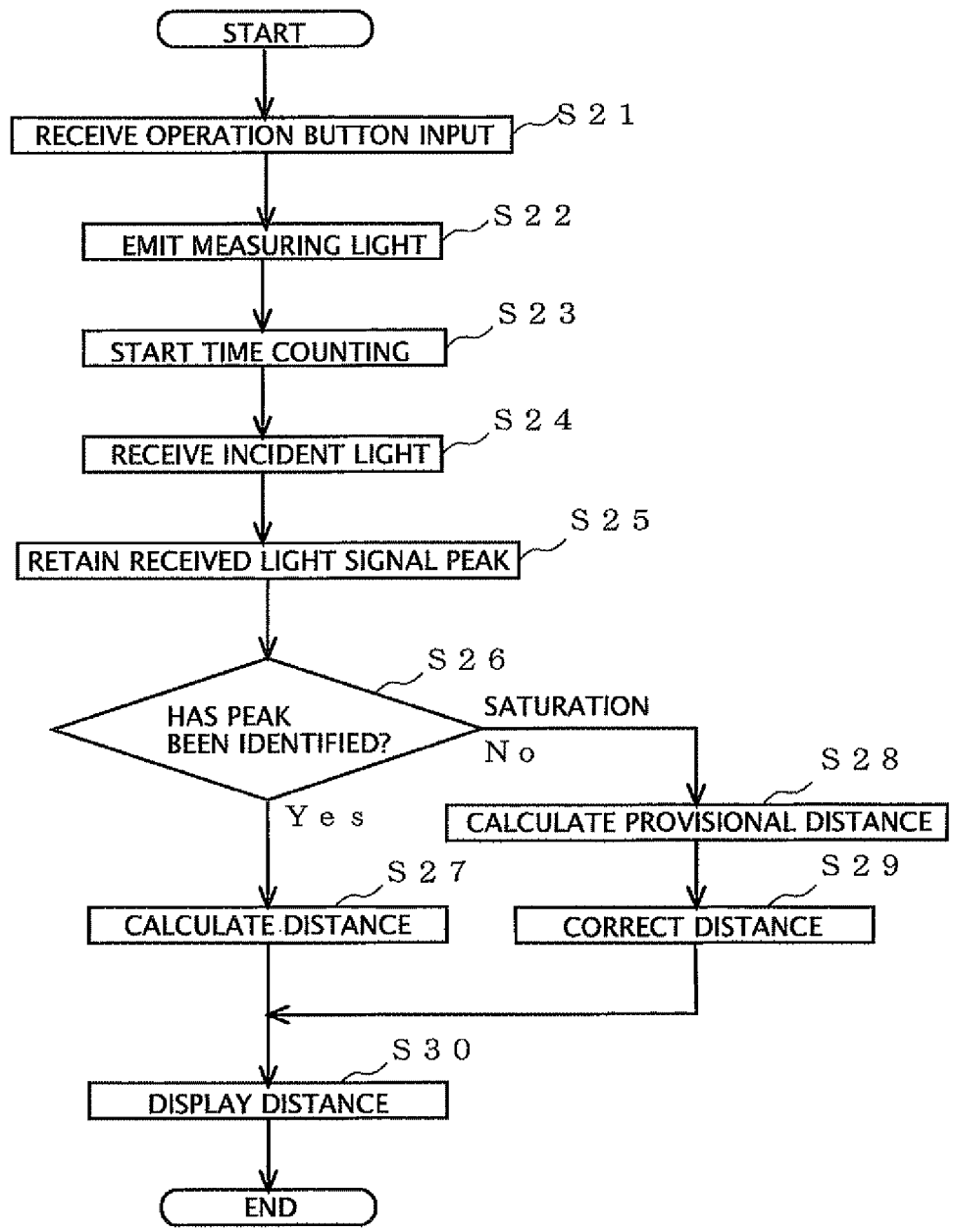
FIG. 7 is a flowchart showing an operation of a distance measuring apparatus according to a second embodiment.

Hereinafter, the operation of the distance measuring apparatus 1 according to the second embodiment will be described. FIG. 7 is a flowchart showing an operational example of a distance measuring apparatus 1 according to a second embodiment. In the second embodiment, an example in which measuring light is emitted once for one distance measurement will be described. Processing of S21 to S24 in FIG. 7 is common to that of S1 to S4 in FIG. 2, and processing of S27 to S30 in FIG. 7 is substantially common to that of S8 to S11 in FIG. 2. Accordingly, as to each processing described above, duplicated description will be omitted.

Step S25: The light receiving level measuring section (the saturation detecting section) 8 uses the peak hold circuit 8a and maintains a peak of a signal received by the light receiving section 4, when light reception is received by the light receiving section 4. Then, the light receiving level measuring section (the saturation detecting section) 8, converts a peak level into a digital signal with an A/D converting section 8b and transmits the digital signal to the controller 6.

Step S26: The controller 6 determines whether or not the peak point in time of the digital-converted light receiving level can be identified. When the above requirements are satisfied (Yes side), the controller 6 moves the processing to step S27. In contrast, when the above requirements are not satisfied (No side), the controller 6 moves the processing to step S28. The controller 6 in S26 determines that the peak point in time cannot be identified, when the light receiving level becomes saturated.

The configuration of the second embodiment described above can also measure the distance up to the object to be measured with accuracy both of when a light receiving level is small in an unsaturated state and when the light receiving level is in a saturated state, as with the first embodiment.

Supplementary Items of Embodiments (1) In the first embodiment, the frequency distribution is obtained from light receiving level and elapsed time, but the elapsed time of a horizontal axis of the frequency distribution may be previously converted to a distance for operation.

(2) In the second embodiment, measuring light may be emitted to the light emitting section 3 by a plurality of times. By measuring reflected light a plurality of times, distance measurement can be performed with higher accuracy than one measurement operation. In this case, it is sufficient that the controller 6 controls the number of times of emission in step S22 and steps S22 to S25 may be looped until the predetermined number of times of emission has been completed, as with step S6 in the first embodiment.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A distance measuring apparatus comprising:
a light emitting section emitting a measuring light toward an object to be measured;
a light receiving section receiving a reflected light being reflected from the object to be measured;
a distance calculating section obtaining a distance to the object to be measured based on an elapsed time which is from a point the measuring light is emitted until a point a light receiving level of the reflected light indicates a peak thereof; and
a distance correcting section correcting a value of the distance to the object to be measured depending on a length of saturation time of the light receiving level when the light receiving level becomes saturated and the peak is impossible to identify, wherein:
the light emitting section emits the measuring light a plurality of times,
the distance calculating section further includes a counting section counting each point where the light receiving section measured a light received amount exceeding a threshold value when the measuring light is emitted the plurality of times and obtaining the light receiving level at each point by accumulating a frequency being counted,
the distance calculating section obtains the distance to the object to be measured based on an elapsed time at a point where an accumulated number of the frequency indicates a peak thereof, and
the distance correcting section corrects, when the accumulated number of the frequency becomes a saturated state, the value of the distance to the object to be measured depending on a length of time in the saturated state.

2. The distance measuring apparatus according to claim 1, wherein
the distance correcting section increases a correction amount for correcting the value of the distance as the length of saturation time of the light receiving level becomes longer.

* * * * *